TRANSLATOR CIRCUIT

Filed May 19, 1961 2 Sheets-Sheet 1

INVENTORS
H. C. EDGREN
L. L. SEVEBECK
BY Albert R. Hodges
ATTORNEY

Jan. 11, 1966 H. C. EDGREN ET AL 3,229,279

TRANSLATOR CIRCUIT

Filed May 19, 1961 2 Sheets-Sheet 2

INVENTORS
H. C. EDGREN
L. L. SEVEBECK
BY Albert R. Hodges
ATTORNEY

United States Patent Office 3,229,279

Patented Jan. 11, 1966

3,229,279
TRANSLATOR CIRCUIT

Harry C. Edgren, Verona, and Laurin L. Sevebeck, Mountainside, N.J., assignors to Western Electric Company, Incorporated, a corporation of New York Filed May 19, 1961, Ser. No. 111,260
4 Claims. (Cl. 340—347)

Figure 1A:
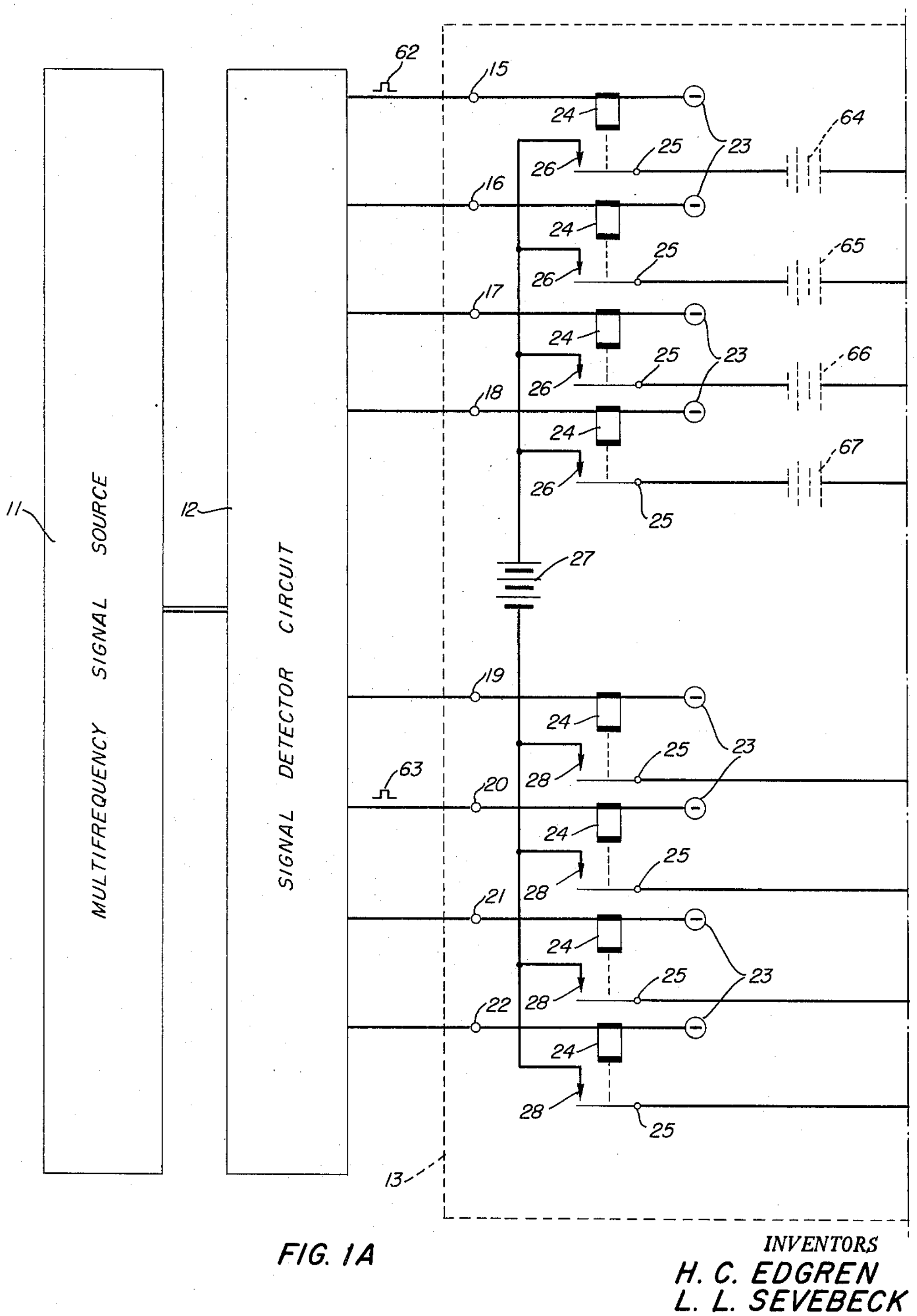

This invention relates to translator circuits and, more particularly, to such circuits that may advantageously be incorporated in transmission systems using multifrequency signaling.

One example of such multifrequency transmission systems is disclosed in the copending application of the coinventors M. V. DiIorio, J. P. Grunfelder and L. L. Seveback, Serial No. 784,983, filed January 5, 1959, now United States Patent No. 3,131,259 issued April 28, 1964. Transmitting data by such a system involves generating a plurality of alternating-current voltages of different frequencies, combining selected ones of these voltages so as to provide for each different data character a distinct coded multifrequency signal, transmitting such coded signals over a telephone network in spaced time relation, analyzing these transmitted signals by means of a signal detector circuit to produce simultaneous electrical pulses each of which is indicative of one of the component frequencies of the transmitted multifrequency signal, and applying such simultaneous detector circuit pulses to a translator circuit for producing an output signal indicative of the information character represented by the transmitted multifrequency signal, such output signal being suitable for registration in an output utilization circuit connected to the translator.

It is the general object of the present invention to provide a reliable, low-cost translator circuit having minimum circuit complexity and being suitable for incorporation in a transmission system of the type described above. More particularly, it is an object of the invention to provide a translator circuit which derives a high-current output pulse from each plurality of simultaneously applied translator input pulses, such output pulse being of suitable magnitude for driving, for example, a key punch output utilization circuit.

In accordance with the present invention, a preferred embodiment comprises a translator circuit having a plurality of input terminals, each of which is connected to one of a plurality of magnetic switching relays having a normally open switching portion. One terminal side of each of such relay switching portions of a first group of such relays is connected to one side of a D.C. potential source, while one terminal side of each of the relay switching portions of a second group of such relays is connected to the other side of the D.C. potential source. The remaining terminal sides of the relay switching portions are connected to a plurality of groups of pairs of serially connected elements, each of such pairs comprising a unidirectionally conductive element and a primary winding of one of a plurality of transformers. The pairs of elements are interconnected so that upon closure of one of the relay switching portions of the first groups of relays and of one of the relay switching portions of the second group of relays, there is provided a distinct, low-resistance conductive loop comprising the D.C. potential source, the closed relay switching portions, and only one of the plurality of pairs of elements. The plurality of transformers comprise secondary windings one end of each of which is connected to a grid or control electrode of one of a plurality of gas discharge tubes, while the other end of each of such secondary windings is connected in common with the corresponding ends of the other of such secondary windings. The cathode electrodes of the tubes are connected in common to a biasing potential source, while the plate electrodes are separately connected to respective translator circuit output terminals.

An alternative embodiment of the present invention has, in lieu of the single D.C. source of the first embodiment, a separate D.C. potential source serially connected between each of the relay switching portions of the first group of relays and the interconnected pairs of serial elements.

Figure 1B:
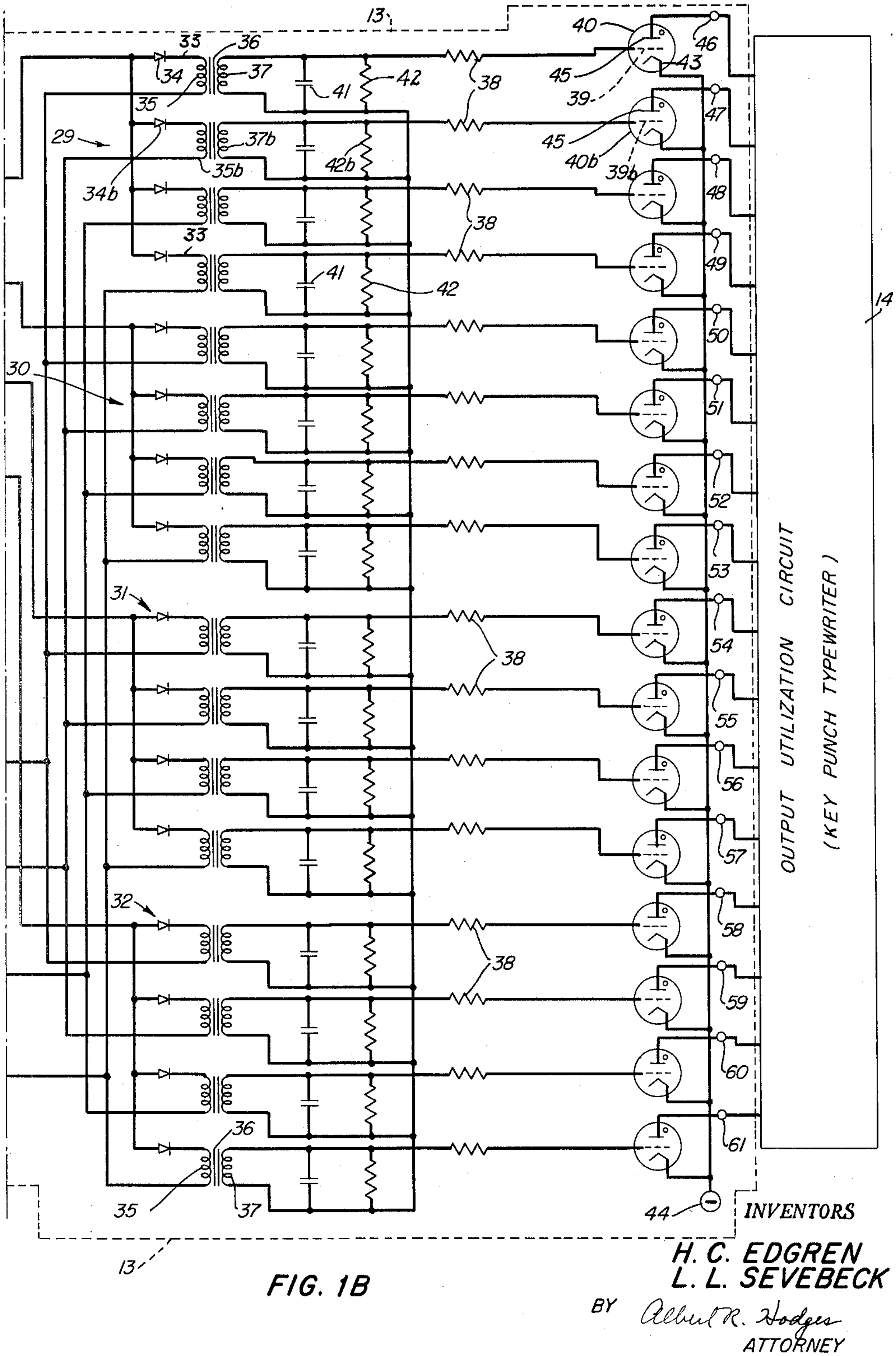

The invention may be readily understood by reference to the following detailed description drawing, FIGS. 1A and 1B of which, placed side by side, depict preferred and alternative translator configurations of the present invention together with appropriate input and output circuitry.

Referring to the drawing, there is illustrated a multifrequency signal source 11 serially connected to a signal detector circuit 12, both of which may be of the types disclosed in the above-mentioned copending application. Connected between the output of detector circuit 12 and the input of a conventional output utilization circuit 14, e.g., a key punch typewriter, is a translator circuit 13 of the present invention.

Translator circuit 13 comprises a plurality of input terminals 15–22, each of which is connected through a magnetic relay 24 to relay biasing source 23. Upon the application of an input pulse to any one of terminals 15–22 a normally open switching portion 25 (e.g., a two-terminal, single-throw type switch) of relay 24 associated with that terminal assumes a closed condition. Magnetic switching relays 24 are divided into two groups by connecting one terminal of each switching portion 25 of a first group 26 of relays 24 to the positive side of a D.C. potential source 27, and by connecting one terminal of each switching portion 25 of a second group 28 of relays 24 to the negative side of source 27.

In regard to relay group 26, the terminal of switching portion 25 associated with input terminal 15 but not connected to source 27 is connected to a serial element group 29 of a plurality of groups 29, 30, 31 and 32 of pairs of serial elements 33, such pairs comprising similarly orientated unidirectionally conductive elements such as blocking diodes 34 and primary windings 35 of a plurality of transformers 36. Corresponding sides of diodes 34 of serial element group 29 are connected in common to switching portion 25 associated with terminal 15, while the ends of primary windings 35 of this group are each connected to an end of a corresponding primary winding 35 of each of the serial element groups 30, 31 and 32. The terminals of switching portions 25 associated with terminals 16, 17 and 18, but not connected to source 27, are each connected in a similar manner to one of the serial element groups 30, 31 and 32, the components of these groups being connected in a manner similar to those of group 29.

With regard to relay group 28, the terminal ends of switch portions 25 associated with terminals 19, 20, 21 and 22, but not connected to source 27, are serially connected to commonly connected ends of corresponding primary windings 35 of serial element groups 29, 30 and 32.

Associated with each of primary windings 35 is a transformer secondary winding 37, one end of which is connected through a grid leak resistor 38 to a grid electrode 39 of one of a plurality of gas discharge tubes 40. The other end of winding 37 is connected in common to the corresponding ends of the other secondaries of a plurality of transformers 36. Connected in parallel across each of windings 37 is a clamping capacitor 41 and an oscillation dampening resistor 42. Tubes 40 have their cathode electrodes 43 connected in common to a cathode biasing source 44 and their respective plate electrodes 45 connected to one of a plurality of translator output terminals 46–61.

The operation of translator circuit 13 is best explained by analyzing the results of the application of a pair of simultaneously applied, relatively low-current pulses 62 and 63 to, for example, translator input terminals 15 and 20. Such pulses are of the type that may be derived by signal detector circuit 12 from a multifrequency signal applied thereto by multifrequency signal source 11. Upon the application of pulses 62 and 63 switching portions 25 of relays 24 associated with terminals 15 and 20 assume their closed conditions. Such closures provide in the input portion of translator circuit 13 a distinct low-resistance conductive loop comprising D.C. potential source 27, switching portion 25 of relay 24 associated with input terminal 15, diode **34*b* and primary winding 35*b* of serial element group 29, and switching portion 25 of relay 24 associated with input terminal 20. D.C. potential source 27 causes a surge of current to flow through this distinct conductive loop and, accordingly, this current passes through primary winding 35*b* and induces a potential across secondary winding 37*b*. Such induced potential provides a single pulse or relatively high magnitude, as compared to input pulses 62 and 63, at grid electrode 39*b*. This pulse ionizes gas discharge tube 40*b*, thus causing the tube to assume its conductive condition. Upon tube 40*b* assuming such a condition a single negative pulse of relatively high current passes from cathode bias source 44, through tube 40*b*, and through terminal 47 to key punch typewriter 14**, such pulse being appropriate for driving such a mechanism.

In a like manner, it will be found that for every distinct combination of simultaneously applied input pulses, each pulse being applied to one of the relays of a different group of relays, there is provided a high-current pulse at a different one of the output terminals 46–61.

It will be appreciated that the above-described arrangement is merely illustrative of the principles of the invention. Numerous other arrangements and modifications may be devised by one skilled in the art without departing from the spirit and scope of the invention. For example, an alternative embodiment of the present invention may be realized by eliminating D.C. potential source 27, by connecting the commonly connected terminal sides of switching portions 25 of both groups of relays 26 and 28 to each other, and by inserting separate D.C. potential sources 64, 65, 66 and 67, indicated in phantom outline in FIG. 1A, between switching portions 25 of relay group 26 and serial element groups 29, 30, 31 and 32. Further, each of tubes 40 may be replaced by a transistor or equivalent solid state device whose base electrode is connected to one end of the secondary transformer windings 37 and whose other electrodes are connected in a manner analogous to that of plate electrodes 45 and cathode electrodes 43.

What is claimed is:

1. A translator circuit comprising a plurality of input terminals, a plurality of relay switching means each having a switching portion that assumes a closed condition upon a pulse being applied to an associated one of said input terminals, first terminal sides of switching portions of a first group of said relay means being connected in common, first terminal sides of switching portions of a second group of said relay means being connected in common, D.C. potential source means connected in series with both said groups of relay means, a plurality of transformers each having a primary winding and a secondary winding, a plurality of groups of pairs of serially connected elements, each of said pairs including a unidirectionally conductive element and one of said primary windings, corresponding sides of said unidirectionally conductive elements of each of said element groups being connected in common to a second terminal side of a switching portion of said first group of relay means, one end of each primary winding of corresponding element pairs of said element groups being connected in common to a second terminal side of a switching portion of said second group of relay means, and output utilization means operatively associated with each of said secondary windings, whereby a path is created including said D.C. potential source means, a closed switching portion associated with the pulsed relay of said first relay group, a selected one of said primary windings, and a closed switching portion associated with the pulsed relay of said second relay group, so that a single selected output is produced upon application of pulses to a pair of said input terminals, one associated with each of said groups of relay means.

2. A translator circuit in accordance with claim 1, further comprising a clamping capacitor and oscillation dampening resistive means connected in parallel across each of said secondary windings.

3. A translator circuit in accordance with claim 1, wherein said D.C. potential source means comprises a plurality of similarly orientated D.C. potential sources each connected between a second terminal side of a switching portion of said first group of relay means and said commonly connected corresponding sides of said unidirectionally conductve elements of one of said element groups.

4. A translator circuit for providing a single output pulse for each plurality of input pulses, comprising a plurality of input terminals, a plurality of relay switching means each having a switching portion that assumes a closed condition upon a pulse being applied to an associated one of said input terminals, first terminal sides of switching portions of a first group of said relay means being connected in common, first terminal sides of switching portions of a second group of said relay means being connected in common, a plurality of transformers each having a primary winding and a secondary winding, a plurality of groups of pairs of serially connected elements, each of said pairs including a blocking diode and one of said primary windings, corresponding sides of said diodes of each of said element groups being connected to a second terminal side of a switching portion of said first group of relay means, one end of each primary winding of corresponding element pairs of said element groups being connected to a second terminal side of a switching portion of said second group of relay means, D.C. potential source means connected between said first terminal sides of said first group of relay means and said first terminal sides of said second group of relay means, and output utilization means operatively associated with each of said secondary windings, whereby a path is created extending from one end of said D.C. potential source means, through a closed switching portion associated with the pulsed relay of said first relay group, through a selected one of said primary windings, through a closed switching portion associated with the pulse relay of said second relay group to the other end of said D.C. potential source means, so that a single selected output is produced upon application of pulses to a pair of said input terminals, one associated with each of said groups of relay means.

References Cited by the Examiner

UNITED STATES PATENTS

| | | | |
|---|---|---|---|
| 1,326,727 | 12/1919 | Hammond | 340—171 |
| 2,691,151 | 10/1954 | Toulon | 340—166 |
| 2,946,043 | 7/1960 | Reenstra et al. | 340—170 X |
| 3,014,202 | 12/1961 | Hanewinkel. | |

NEIL C. READ, *Primary Examiner.*

P. XIARHOS, *Assistant Examiner.*

UNITED STATES PATENT OFFICE

CERTIFICATE OF CORRECTION

Patent No. 3,229,279 January 11, 1966

Harry C. Edgren et al.

It is hereby certified that error appears in the above numbered patent requiring correction and that the said Letters Patent should read as corrected below.

Column 1, line 16, for "Seveback" read -- Sevebeck --; column 2, line 10, after "description" insert -- and --; line 24, after "to" insert -- a --; line 56, for "switch" read -- switching --; line 59, after "30" insert -- , 31 --; column 3, line 23, for "or" read -- of --.

Signed and sealed this 6th day of December 1966.

(SEAL)
Attest:

ERNEST W. SWIDER
Attesting Officer

EDWARD J. BRENNER
Commissioner of Patents